(12) United States Patent
Yi et al.

(10) Patent No.: US 11,938,871 B1
(45) Date of Patent: Mar. 26, 2024

(54) PEDESTRIAN PROTECTION SYSTEM FOR SENSOR POD CAMERA IMPACT

(71) Applicant: Zoox, Inc., Foster City, CA (US)

(72) Inventors: Austin In-Jei Yi, San Francisco, CA (US); Mark Alan Bates, Kenilworth (GB); Daniel Glenn Johnson, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 186 days.

(21) Appl. No.: 17/514,969

(22) Filed: Oct. 29, 2021

(51) Int. Cl.
| | | |
|---|---|---|
| *B60R 11/04* | (2006.01) | |
| *B60R 11/00* | (2006.01) | |
| *G03B 17/56* | (2021.01) | |
| *H04N 23/51* | (2023.01) | |
| *H04N 23/52* | (2023.01) | |
| *H04N 23/54* | (2023.01) | |
| *H04N 23/55* | (2023.01) | |
| *H04N 23/57* | (2023.01) | |

(52) U.S. Cl.
CPC ............ *B60R 11/04* (2013.01); *G03B 17/561* (2013.01); *H04N 23/51* (2023.01); *H04N 23/52* (2023.01); *H04N 23/54* (2023.01); *H04N 23/55* (2023.01); *H04N 23/57* (2023.01); *B60R 2011/004* (2013.01); *B60R 2011/0049* (2013.01); *B60R 2011/008* (2013.01)

(58) Field of Classification Search
CPC ........ H04N 23/50; H04N 23/51; H04N 23/52; H04N 23/54; H04N 23/55; H04N 23/57; B60R 11/04; B60R 2011/004; B60R 2011/0049; B60R 2011/008; G03B 17/02; G03B 17/04; G03B 17/56; G03B 17/561; G03B 2217/00; G03B 2217/002
See application file for complete search history.

(56) References Cited

U.S. PATENT DOCUMENTS

| | | | |
|---|---|---|---|
| 9,718,405 B1* | 8/2017 | Englander | B60R 1/00 |
| 10,579,882 B1* | 3/2020 | Llamazares Domper | G01S 15/931 |
| 11,305,724 B2* | 4/2022 | Adams | B60R 21/34 |
| 2007/0162231 A1* | 7/2007 | Schlogl | B60R 21/0136 701/301 |
| 2012/0062789 A1* | 3/2012 | Sasaki | G03B 17/561 348/E5.026 |
| 2012/0274770 A1* | 11/2012 | Lee | G07C 5/0866 348/148 |
| 2015/0274090 A1* | 10/2015 | Buschmann | H04N 23/51 224/567 |
| 2015/0329037 A1* | 11/2015 | Lombrozo | B60Q 1/0483 248/560 |
| 2016/0318456 A1* | 11/2016 | Moenig | G06V 10/147 |
| 2018/0039163 A1* | 2/2018 | Halsey | G03B 17/08 |
| 2018/0134217 A1* | 5/2018 | Peterson | G06V 20/58 |
| 2018/0265015 A1* | 9/2018 | Rohrmüller | B60R 1/0617 |
| 2020/0331496 A1* | 10/2020 | Cao | B60W 30/14 |
| 2021/0067665 A1* | 3/2021 | Shukla | H04N 23/6812 |

(Continued)

*Primary Examiner* — Twyler L Haskins
*Assistant Examiner* — Akshay Trehan
(74) *Attorney, Agent, or Firm* — Lee & Hayes, P.C.

(57) ABSTRACT

A sensor pod system includes one or more sensor pods with a plurality of sensors configured to collect data from an environment. A sensor pod may include a housing and extend from a portion of a body of a vehicle. The sensor pod housing may have energy absorbing structures configured to absorb and dissipate energy during an impact in order to protect a pedestrian.

20 Claims, 9 Drawing Sheets

(56) References Cited

U.S. PATENT DOCUMENTS

2021/0287546 A1\* 9/2021 Englander .............. B60Q 5/006
2021/0339699 A1\* 11/2021 Adams ................... B60R 21/34

\* cited by examiner

PEDESTRIAN PROTECTION SYSTEM FOR SENSOR POD CAMERA IMPACT

BACKGROUND

Many vehicles in operation today are designed to perceive their surroundings using sensors. The sensors are often integrated into the vehicle, for example, in vehicle body panels. Integration into the vehicle body, however, often limits the field of view of the sensors. In other examples, sensors may be mounted to an exterior of a vehicle, such as on a roof of the vehicle. However, placement of the sensors on the exterior of the vehicle increases a likelihood of the sensor impacting an external object, which may cause damage to the sensor and/or the impacted object. These and other issues are complicated by the number and type of sensors to be included on the vehicle. While sensor technology is improving, compact, electric, bidirectional, and/or autonomous vehicles have unique components and configurations that, under certain conditions, conventional sensor systems may be insufficient to provide data to the vehicle during operation or may cause long delays while the sensors are replaced.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
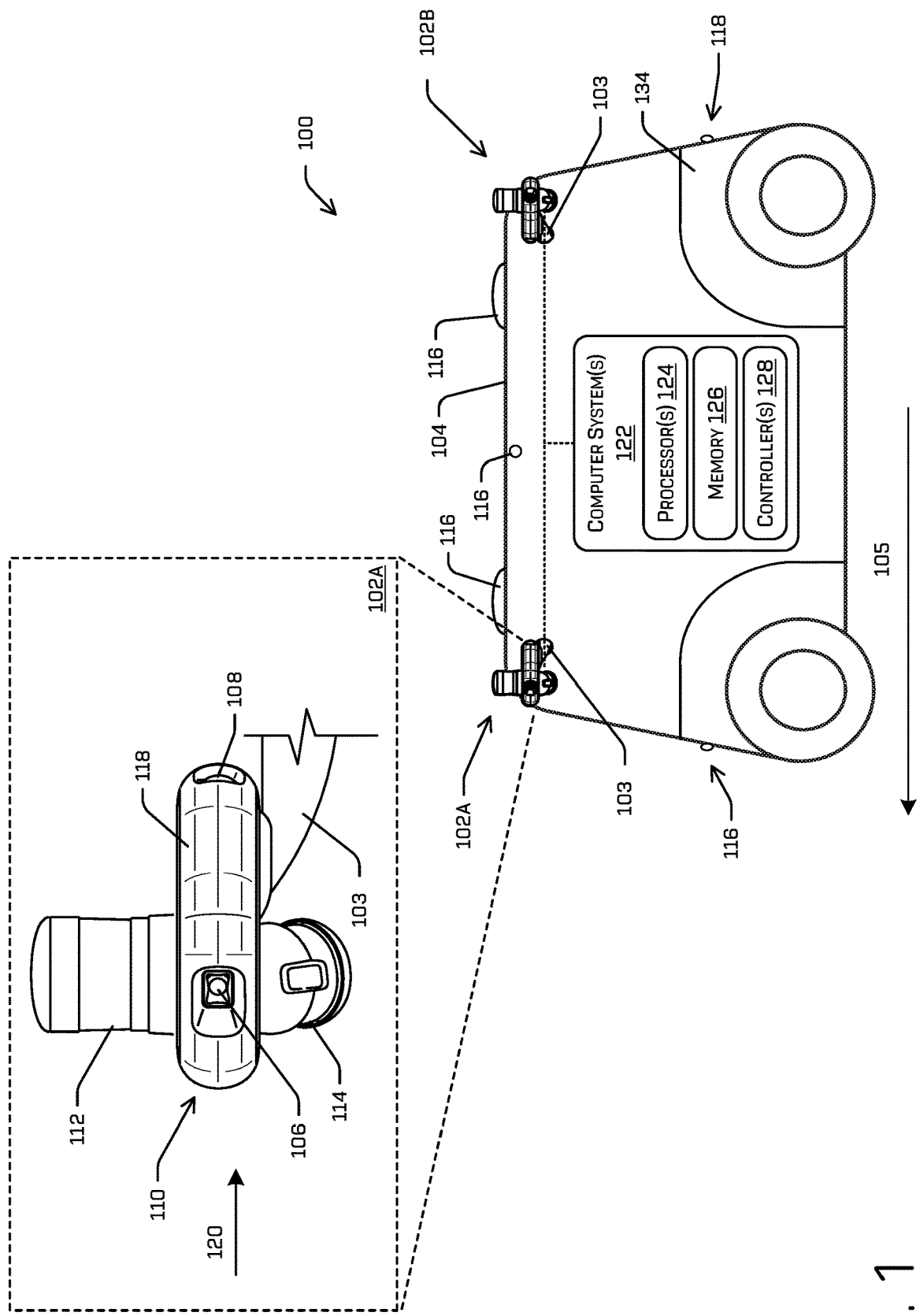
FIG. 1 is an illustration of an example vehicle having one or more sensor pods to collect and provide data to the autonomous vehicle, in accordance with examples of the disclosure.

As discussed above, integration of sensors into a body of a vehicle may not provide sufficient sensor coverage. Moreover, sensors that are integrated into a vehicle body may be less easily accessible, and thus more time consuming to install and/or replace. For example, removing a sensor for testing/replacement often requires the removal of the body panel and/or other portions of the vehicle. Aspects of the present disclosure relate to sensors mounted on an exterior of the vehicle. While such externally-mounted sensors are more readily installed, removed, replaced, and the like, the sensors may extend outboard of the vehicle body, effectively increasing a footprint of the vehicle. With this increased footprint, the sensors may be more likely to impact, or be impacted by, external objects. Such impacts may cause damage to the sensor and/or the object impacted.

This application relates to structures and techniques for improving vehicle sensor placement, packaging, maintenance, and replacement, while providing protection to objects around the vehicle, including pedestrians. In examples, the sensors may be embodied as or otherwise included in self-contained assemblies or "sensor pods" that are removably coupled to the vehicle. Multiple sensor pods, for example four, may be disposed around an exterior of the vehicle to provide sensor coverage for an environment surrounding the vehicle.

In examples of this disclosure, a sensor pod may include a frame comprising a mounting interface removably coupling the sensor pod to a vehicle. In examples, the sensor pod may include multiple sensors mounted to locations on the frame where each location provides the respective sensor a field of view that complements the fields of view of the other sensors in the sensor pod to create an effective field of view for each sensor pod. In examples, the sensor pod may have multiple sensor types. For example, several of the sensors may be imaging sensors, for example, cameras (e.g., RGB-cameras, monochrome cameras, intensity (grey scale) cameras, infrared cameras, ultraviolet cameras, depth cameras, stereo cameras, time-of flight (TOF) sensors, and the like), while other sensors may be ranging or distancing sensors, for example, a light detection and ranging (lidar) sensor, a radio detection and ranging (RADAR) sensor, one or more ultrasonic transducers, such as a sound navigation and ranging (SONAR) sensor, or another known sensor type. Other types of sensors, such as inertial measurement sensors, and the like may additionally or alternatively be included in the sensor pods. In examples, the sensors of the same type within the sensor pod may have different and/or overlapping fields of view to provide coverage for a portion of the environment surrounding the vehicle.

In examples, the frame may be cast and provide sensor locations through cast surfaces. In examples, the cast frame provides a rigid mount for the sensors, and spaces the sensors in the pod slightly away from the vehicle. The cast surfaces may provide mounting interfaces with sufficient accuracy without requiring a secondary process of machining the surfaces. Use of such mounting surfaces may, in some examples, reduce the computational resources required for calibration (e.g., by ensuring that the sensors are placed within some known tolerance) as well as by reducing the number of required calibrations by ensuring little to no movement when operating the vehicle.

Because of the positioning of the sensors away from the body of the vehicle, the sensor may be more prone to contact with objects proximate the vehicle, including pedestrians or sensitive portions of users. For example, a sensor pod may be located a distance from a ground and may present a hazard to a head of a pedestrian outside of the vehicle. To mitigate the effects of contacting a pedestrian, this application describes various impact structures that mitigate forces, and in particular forces resulting from collisions with the sensor pod when the vehicle is travelling in a forward direction.

In examples, a first impact mitigation structure is associated with a first camera, which may be a front-facing camera. The impact mitigation structure can include a baffle disposed at least partially around the camera. The baffle can include one or more weakened areas that cause the baffle to deform in a predictable manner when acted upon by an impact force. The deformation of the baffle may diffuse energy from the impact, as well as protect the camera from damage.

In another aspect of this disclosure, a second impact mitigation structure is associated with a LiDAR sensor, which may be a lower LiDAR sensor, e.g., at least partially protruding below the sensor pod. The second impact mitigation structure can include a LiDAR mount that is configured to deform at a first force in a first direction and to deform in a second direction, normal to the first direction, at a (significantly) higher force. For example, the LiDAR mount may include one or more ribs that provide enhanced rigidity in a vertical direction, but that provide for improved deflection and flexibility in a horizontal direction. In examples, the LiDAR mount may be formed from a polymer material to enhance the flexibility in the horizontal direction.

In other aspects of this disclosure, a third impact mitigation structure is associated with a LiDAR sensor, which may be an upper LiDAR sensor, e.g., at least partially protruding above the sensor pod. The third impact mitigation structure can include a deformable or breakable connection of the upper LiDAR sensor to a frame of the sensor pod. For example, the connection can include deformable legs or shear pins. In examples, the third impact mitigation structure can also include a cooling plate configured to dissipate heat from the LiDAR sensor.

While certain examples are provided in the context of a vehicle having sensor pods disposed proximate four corners of the vehicle and at an elevation near a top surface of the vehicle, in other examples other numbers and configurations of sensor pods may be used and/or the sensor pods may be disposed at other locations (e.g., elevations, lateral spacing, and/or longitudinal spacing) relative to the vehicle. Additionally, while example sensor pods provided herein include particular combinations of sensors of multiple different types, in other examples, sensor pods incorporate fewer sensors of some types and additional sensors of other types. In other examples, sensor pods may include a larger number of some sensors disposed on the sensor pod to provide a desired resolution or redundancy.

FIG. 1 is an illustration of an example vehicle 100 having one or more sensor pod assemblies configured with multiple sensors to collect information about the surroundings of the autonomous vehicle, in accordance with examples of the disclosure. The vehicle 100 shown in FIG. 1 is a bi-directional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, aspects of sensor assemblies described herein may be applicable to non-autonomous and/or non-bidirectional vehicles as well. Also, while examples are given in which the vehicle is a land vehicle, the techniques described herein are also applicable to aerial, marine, and/or other vehicles.

In the illustrated example, the vehicle 100 includes a first sensor pod assembly 102A and a second sensor pod assembly 102B (collectively "sensor pod assemblies 102") coupled, via a sensor pod mount 103 to a body 104 of the vehicle 100. In FIG. 1, the first sensor pod assembly 102A is on a leading end of the vehicle 100 and the second sensor pod assembly 102B is on a trailing end of the vehicle 100 when the vehicle 100 is travelling forward in a direction shown by an arrow 105. As noted above, the vehicle 100 may be a bi-directional vehicle, e.g., configured to travel forward in the direction shown by the arrow 105 or alternately forward in an opposite direction. Thus, the sensor pod assemblies 102 may be alternately on the leading end of the vehicle, e.g., sensing objects generally in front of the vehicle 100, or on the trailing end of the vehicle 100, e.g., sensing objects generally behind the vehicle 100. In examples, each of the sensor pod assemblies 102 may be substantially identical, e.g., including the same or similar sensors configured to sense a field of view relative to the respective sensor pod assemblies 102.

FIG. 1 also includes a close-up of the first sensor pod assembly 102A. The sensor pod assembly 102A includes a plurality of sensors, including sensors of multiple modalities. Specifically, the sensor pod assembly 102A includes a side-facing camera 106 and a rear-facing camera 108. Although not visible in FIG. 1, the sensor pod assembly 102A also includes a front-facing camera (the location of which is shown generally by the reference numeral 110). The sensor pod assembly 102A also includes a first LiDAR sensor 112 and a second LiDAR sensor 114. As shown, the first LiDAR sensor 112 is generally on top of the first sensor pod assembly 102A and the second LiDAR sensor 114 is generally on a bottom of the first sensor pod assembly 102A. Although the first sensor pod assembly 102A is illustrated as including three cameras and two LiDAR sensors, the first sensor pod assembly 102A may include more, fewer, and/or different types of sensors. Moreover, and as shown in FIG. 1, the vehicle 100 may have one or more additional sensors 116 disposed at other positions on the vehicle 100.

FIG. 1 also shows that the first sensor pod assembly 102A includes an outer shell 118 or trim. The outer shell 118 may be disposed to protect aspects of the cameras 106, 108, 110 and/or the LiDAR sensors 112, 114, e.g., from the environment. Without limitation, the outer shell 118 can form an enclosure for the various sensors and electronic components disposed within the sensor pod assemblies 102.

In operation, the sensors associated with the sensor pod assemblies 102 are configured to generate sensor data associated with an environment of the vehicle. For instance, the sensor pod assemblies 102 may, together, have an effective field of view that provides sensor data for substantially all of the area surrounding the vehicle 100, e.g., 360-degrees about the vehicle 100. Moreover, sensors associated with the sensor pod assemblies 102 may be configured to provide overlapping fields of view, e.g., such that at least two sensors are configured to generate data for regions about the vehicle 100.

Data from the sensors associated with the sensor pod assemblies 102 is transmitted, e.g., via a wired or wireless connection, to one or more computer systems 122 associated with the vehicle 100. In some examples, the computer system(s) 122 control operation of one or more systems of the vehicle 100. In the illustrated example, the computer system(s) 122 include one or more processors 124, memory 126 communicatively coupled to the processor(s) 124, and one or more controllers 128. In examples, the memory may store instructions to receive and process sensor data from one or more sensors and to plan a route for the vehicle 100 through an environment. For instance, the planned route may be implemented via the controller(s) 128 operating the vehicle 100 autonomously.

The processor(s) 124 of the vehicle 100 may be any suitable processor capable of executing instructions to process data and perform operations as described herein. By way of example and not limitation, the processor(s) 124 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 126 is an example of non-transitory computer-readable media. The memory 126 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 126 may include at least a working memory and a storage memory. For example, the working memory may be a high-speed memory of limited capacity (e.g., cache memory) that is used for storing data to be operated on by the processor(s) 124. In some instances, memory 130 may include a storage memory that may be a lower-speed memory of relatively large capacity that is used for long-term storage of data. In some cases, the processor(s) 128 cannot operate directly on data that is stored in the storage memory, and data may need to be loaded into a working memory for performing operations based on the data, as discussed herein.

The computer system(s) 122 are generally configured to control aspects of the vehicle 100, including planning a route for the vehicle 100 to take relative to objects in the environment and controlling movement of the vehicle 100 relative to such objects. As illustrated in FIG. 1, and as noted above, the sensor pod assemblies 102 are disposed on the vehicle 100 at positions to provide adequate fields of view for detecting objects relative to the vehicle 100. In some instances, including the illustrated example, the sensor pod assemblies 102 protrude laterally from a side of the body 104 of the vehicle 100, e.g., to effectively increase the footprint of the vehicle 100. Although the computer system(s) 122 are configured to prevent contact with objects by the vehicle 100, including by the sensor pod assemblies 102, because of this location of the sensor pod assemblies 102 on the vehicle 100, the sensor pod assemblies 102 may be particularly prone to contacting objects (or being contacted by objects), including pedestrians, in the environment of the vehicle 100. That is, the vehicle 100 may have complex systems that aid in preventing unintended contact with people within the environment. In situations where contact is not prevented, however, the present disclosure provides additional pedestrian protection, e.g., to limit injury to pedestrians that may contact the sensor pod assemblies 102.

Aspects of this disclosure are particularly directed to mitigating the effects of forces generally in the direction shown by arrow 120, which is generally opposite the direction of travel of the vehicle 100 (shown by the arrow 105 in FIG. 1.) More specifically, this disclosure describes impact mitigation structures and techniques for reducing an impact generally parallel to the direction of the arrow 120 proximate the front-facing camera 110, the first LiDAR sensor 112, and/or the second LiDAR sensor 114. Such impact may be associated with contact of the sensor pod assembly with a pedestrian, for example.

One current measure of pedestrian protection is the Head Injury Criteria ("HIC") score. The HIC score is one metric of determining the level of pedestrian protection provided by a vehicle. The HIC score may be calculated using equation (1):

$$HIC = \left[ \frac{1}{t_2 - t_1} \int_{t_1}^{t_2} a\, dt \right]^{2.5} (t_2 - t_1) \qquad (1)$$

Specifically, as will be appreciated from Equation (1), the HIC score is a measure of the acceleration concentration as a proxy for force/energy applied over a period of time between $t_1$ and $t_2$. Specifically, in Equation (1), a is a resultant head acceleration, $t_2$ and $t_1$ describe a time period during which the highest HIC score is calculated, e.g., during a collision event, and wherein $t_2-t_1 \leq 15$ ms. Thus, Equation (1) may be used to determine candidate HIC scores for any number of intervals of the time period, with the highest of the candidate HIC scores being the The system may use one or more of the techniques described in Regulation (EC) No 78/2009 Of The European Parliament And Of The Council of 14 Jan. 2009 on the type-approval of motor vehicles with regard to the protection of pedestrians and other vulnerable road users (discussing Head Performance Criterion ("HPC")) and European New Car Assessment Programme Pedestrian Testing Protocol, Version 8.4, November 2017 (discussing HIC15 testing) the disclosures of which are incorporated herein by reference, to test and determine an HIC or HPC score. In examples of this disclosure, impact mitigation systems associated with the sensor pod assemblies 102 may be configured to provide a pedestrian protection system with a HIC score below 1000, or more preferably below a HIC score of 900 during nominal driving conditions.

Figure 2:
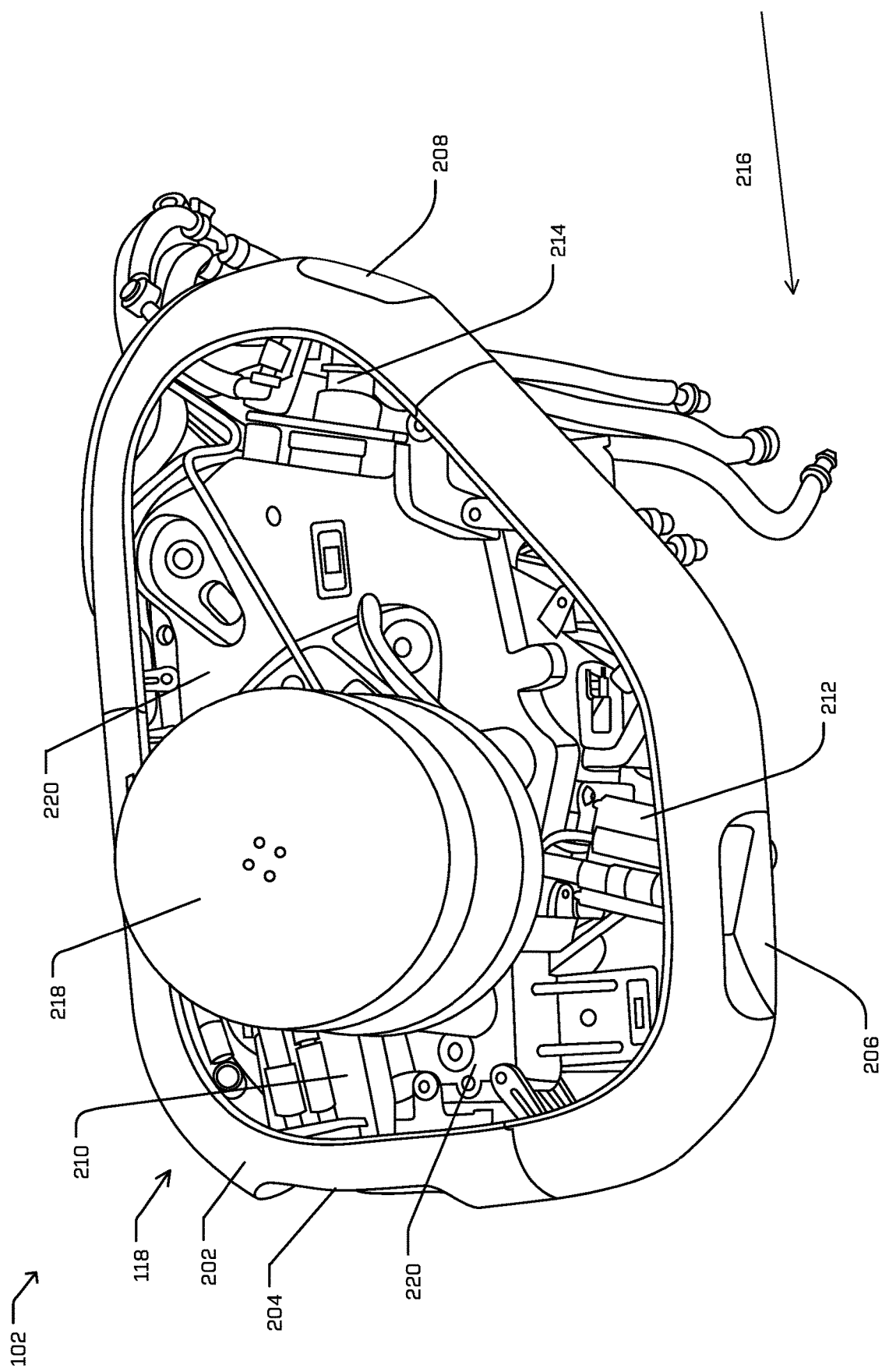
FIG. 2 is a top perspective view of an example sensor pod, in accordance with examples of the disclosure.
Figure 3:
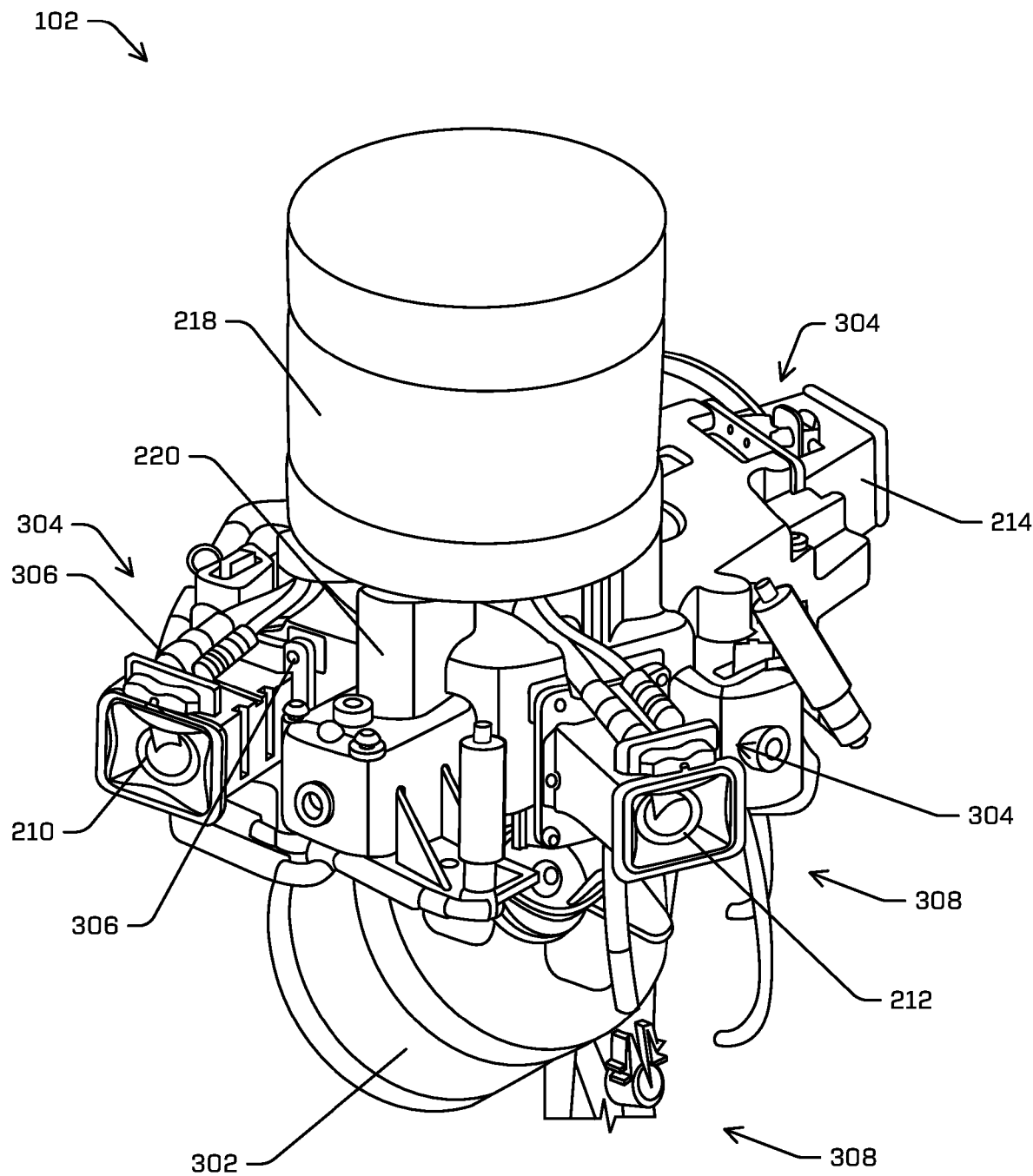
FIG. 3 is a perspective view of a sensor pod with an external shell removed, in accordance with examples of the disclosure.
Figure 4:
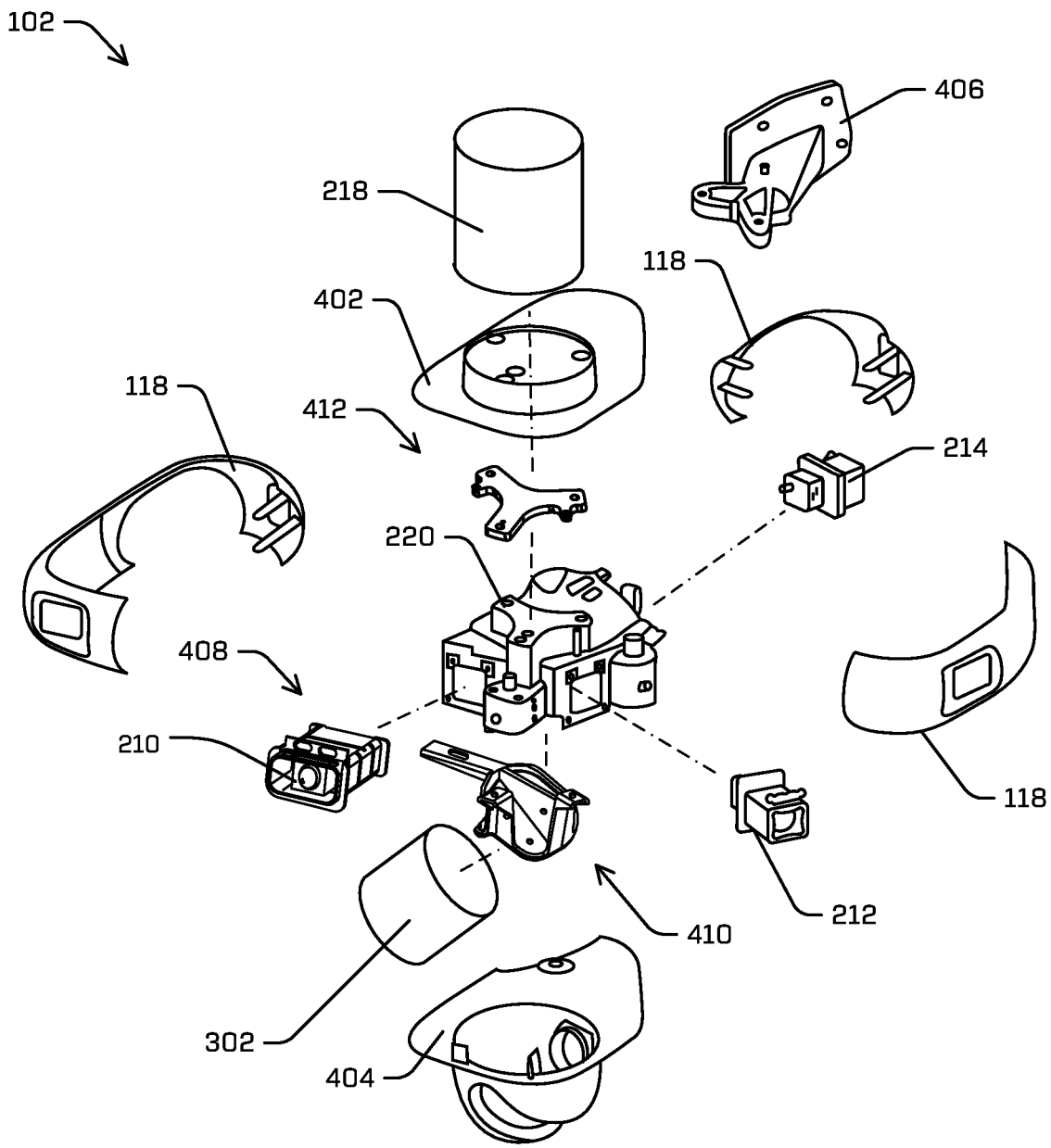
FIG. 4 is an exploded view of an illustrative sensor pod, in accordance with examples of the disclosure.
Figure 5:
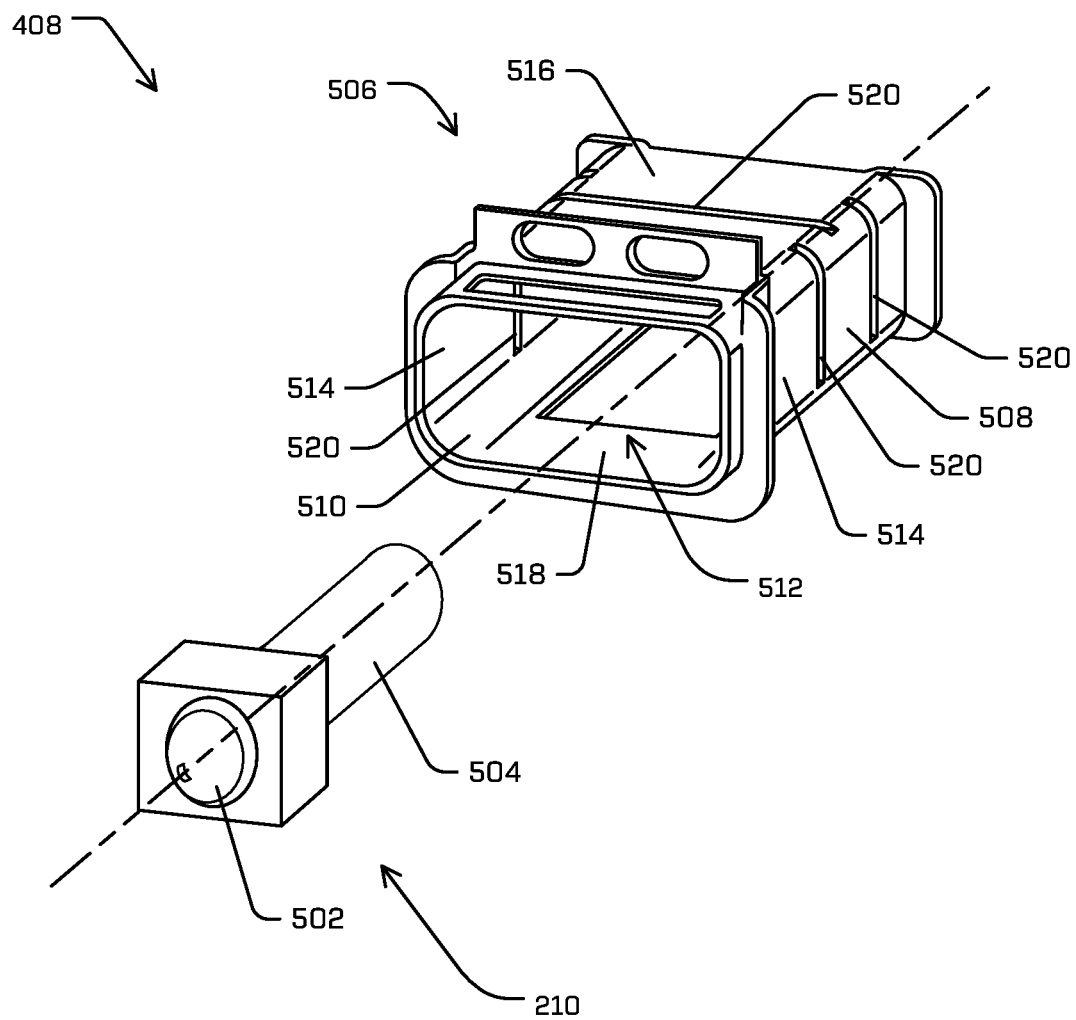
FIG. 5 is a perspective view of an impact mitigation structure associated with a camera of a sensor pod, in accordance with examples of the disclosure.
Figure 6A:
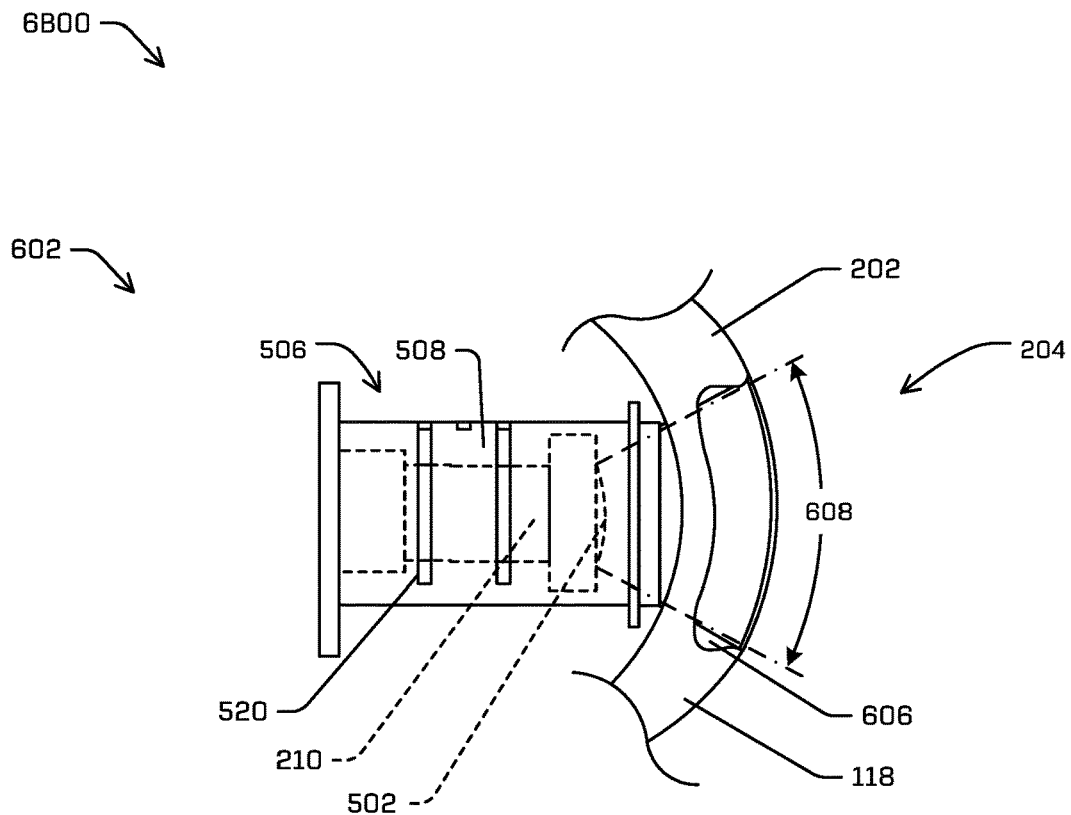
FIGS. 6A and 6B are side views of the impact mitigation structure of FIG. 5, in accordance with examples of the disclosure.
Figure 6B:
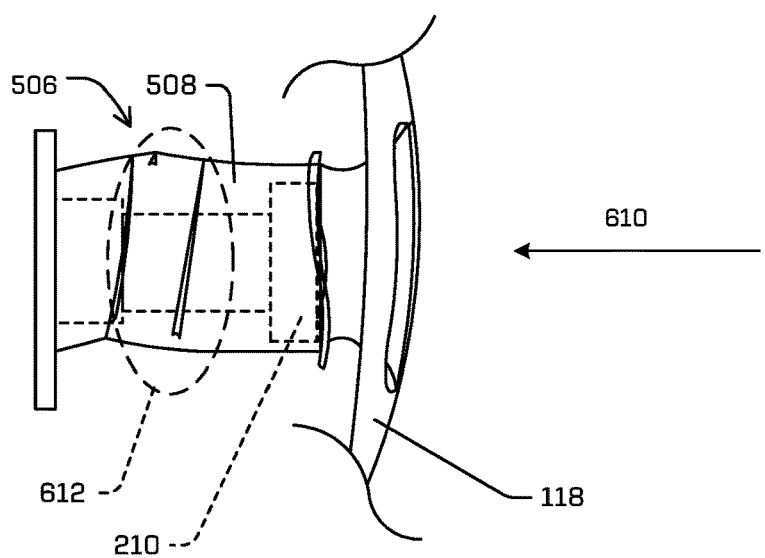
Figure 7:
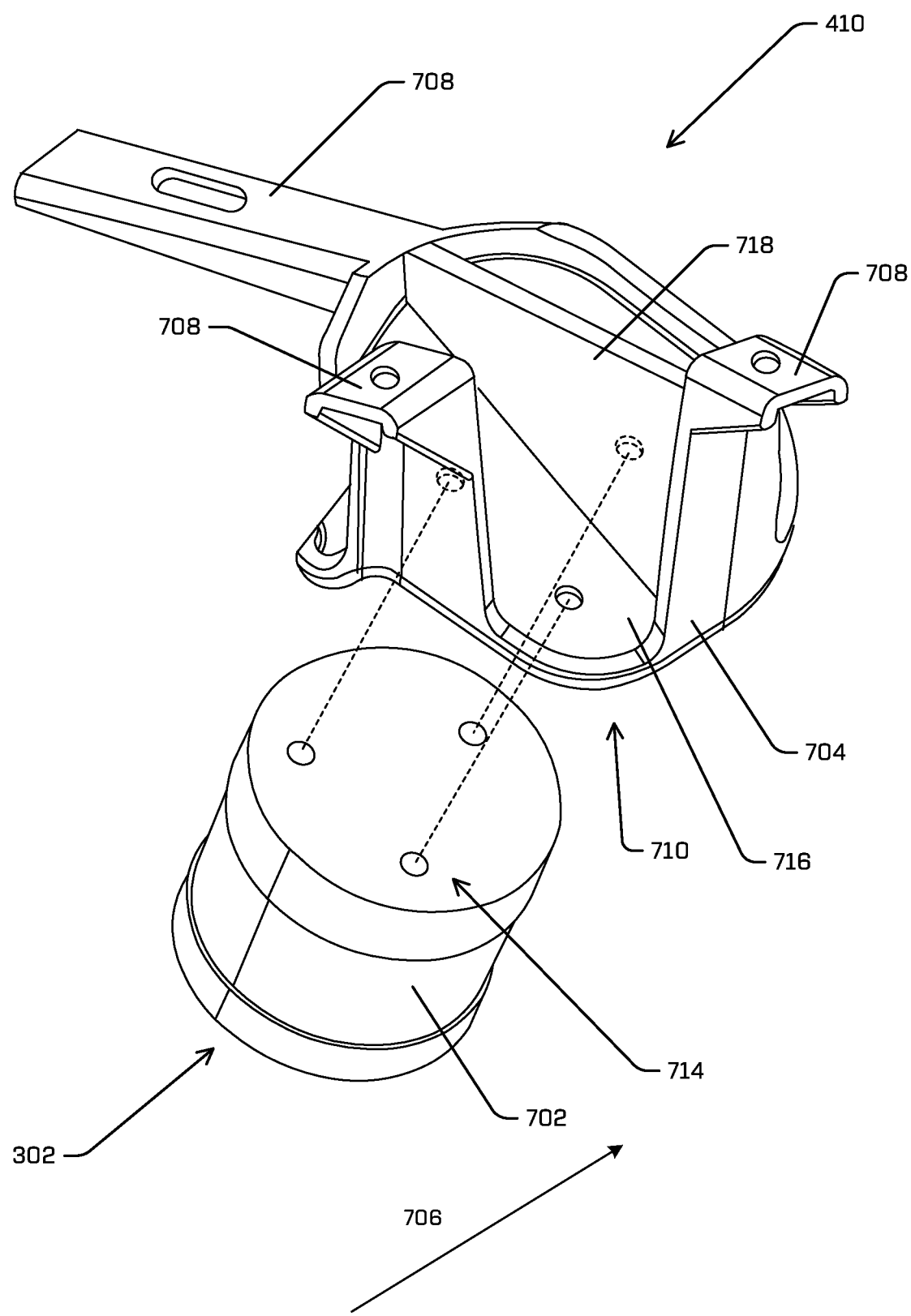
FIG. 7 is a perspective view of an impact mitigation structure associated with a LiDAR sensor, in accordance with examples of this disclosure.
Figure 8:
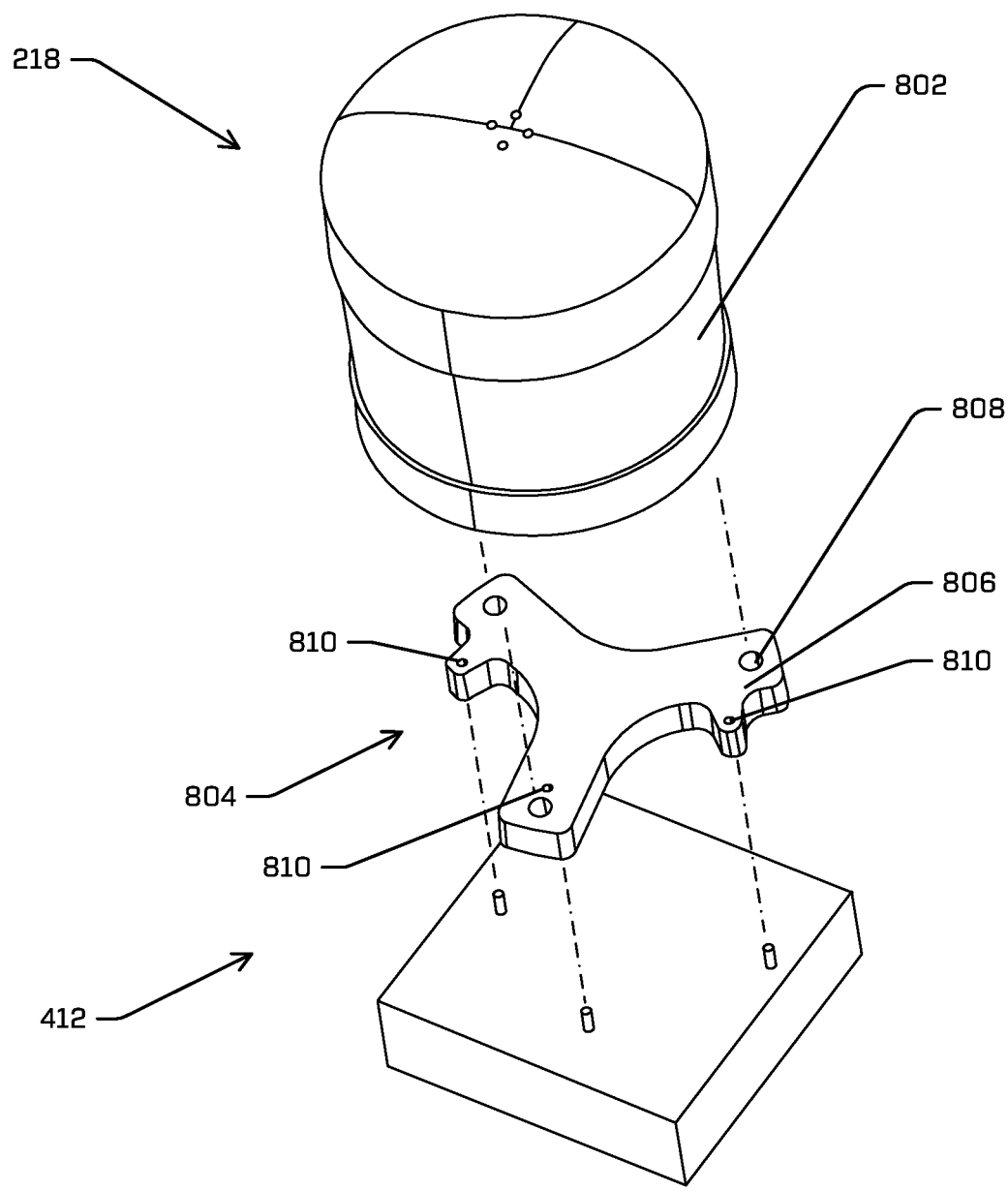
FIG. 8 is a perspective view of another impact mitigation structure associated with another LiDAR sensor, in accordance with examples of this disclosure.
Figure 9:
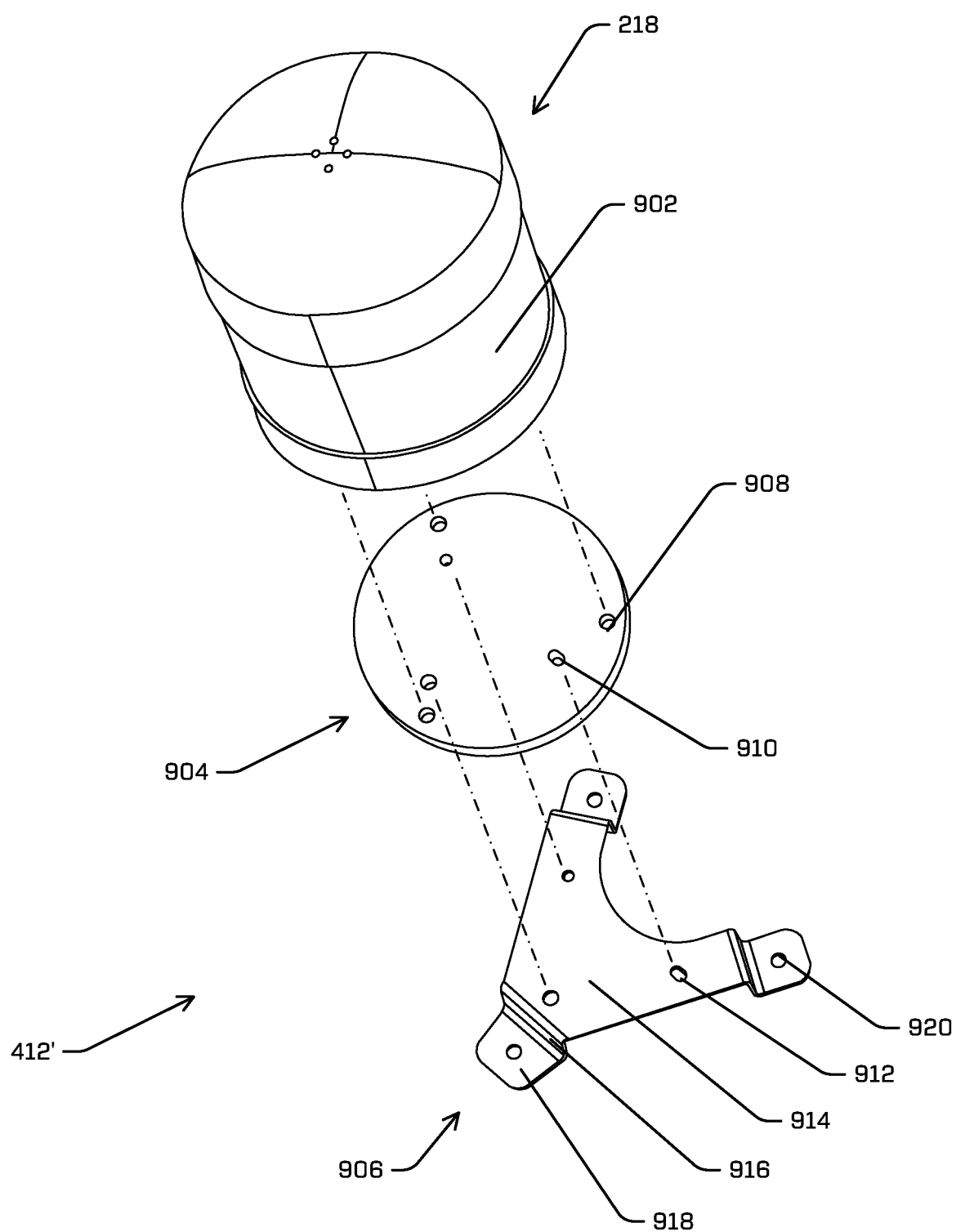
FIG. 9 is a perspective view of another impact mitigation structure associated with another LiDAR sensor, in accordance with examples of this disclosure.

The impact mitigation structures of the present disclosure are detailed further below with reference to additional figures. Specifically, FIGS. 2 and 3, are perspective views, and FIG. 4 is an exploded view, of one of the sensor pod assemblies 102. FIGS. 5, 6A, and 6B illustrate aspects of impact mitigation structures associated with a camera, such as the front-facing camera 110. FIG. 7 shows aspects of impact mitigation structures associated with a LiDAR sensor, such as the second LiDAR sensor 114, and FIGS. 8 and 9 show aspects of impact mitigation structures associated with another LiDAR sensor, such as the first LiDAR sensor 112.

FIG. 2 shows a perspective view of one of the sensor pod assemblies 102. For example, FIG. 2 is a top perspective view showing additional details associated with the outer shell 110 and some internal components. In the illustration, the outer shell 110 generally defines an outer surface 202 that is generally convex. The outer shell 110 also defines a first bezel opening 204, a second bezel opening 206, and a third bezel opening 208. Specifically, the first bezel opening 204 is aligned with a front-facing camera 210, the second bezel opening 206 is aligned with a side-facing camera 212, which may be the side-facing camera 106, and the third bezel opening 208 is aligned with a rear-facing camera 214, which may be the rear-facing camera 108. Specifically, the bezel openings 204, 206, 208 align with the respective cameras to prevent the outer shell 110 from impacting the field of view of the respective cameras. As illustrated in FIGS. 1 and 2, the bezel openings 204, 206, 208 may include generally concave walls extending from the outer surface 202 to an opening that approximates the field of the view of the associated camera. As will be appreciated, the terms "front-facing," "side-facing," and "rear-facing" are relative terms that assume a direction of travel of the sensor pod assembly 102 generally along an arrow 216 in FIG. 2. As will be appreciated, when the sensor pod is travelling in a direction opposite the arrow 216, the front facing camera 210 may actually be "rear-facing" relative to the direction of travel.

In the example of FIG. 2, the outer shell 110, the front-facing camera 210, the side-facing camera 212, and the rear-facing camera 214, as well as an upper lidar sensor 218 (which may correspond to the first LiDAR sensor 112 in FIG. 1) are coupled to a frame 220. In examples, the frame 220 may be a single piece with a number of mounting structures, faces, and/or features to which the various cameras, sensors, and/or other features are coupled to the frame 220. The frame 220 may also include features to facilitate mounting of the frame 220, and thus the sensor pod assemblies 102, to the vehicle 100. For instance, and without limitation, the frame 220 may have mounting features, such as bolt holes, tabs, alignment surfaces, or the like, that cooperate with mounting features on the sensor pod mount 103 to secure and/or position the sensor pod assembly 102 relative to the vehicle 100.

The frame 220 can be substantially rigid and may be made from different materials. For example, the frame 220 may be made from a metal (e.g., aluminum, steel, magnesium, or combinations thereof) or composite materials including carbon, Kevlar, resin, glass, or plastics. In some specific examples, the frame 220 is made from cast aluminum or magnesium-aluminum alloy. The cast frame may provide strength, rigidity, repeatability of manufacture, and/or decreased cost relative to a frame fully machined from a billet. In examples, the mounting locations on the frame 220 have mounting surfaces to support and orient the sensor by registering off of the mounting surface. In examples, the mounting surface is machined to provide a reference surface with tolerances sufficient to orient the sensors relative to each other as well as to the vehicle. In examples, the mounting location on the frame 220 have cast surfaces at the mounting locations to support and orient the sensor. In these examples, the cast surface does not require a secondary operation of machining to provide reference surfaces. Rather the cast surface is controlled during the casting process to provide the reference surface with tolerances sufficient to orient the sensors relative to each other as well as to the vehicle.

FIG. 3 is another perspective view of one of the sensor pod assemblies 102. In FIG. 3, the outer shell 118 is removed to better show internal components. Reference numerals from FIGS. 1 and/or 2 are used in FIG. 3 to identify the same features. For example, FIG. 3 better shows the frame 220, to which is mounted the front-facing camera 210, the side-facing camera 212, the rear-facing camera 214, and the upper lidar sensor 218. FIG. 3 also illustrates a lower lidar sensor 302, mounted to a lower side of the frame 220. As will be appreciated, the lower lidar sensor 302 may correspond to the second LiDAR sensor 114 in FIG. 1.

FIG. 3 also shows portions of cleaning systems 304 associated with each of the cameras 210, 212, 214. The cleaning systems 304 are disposed to clean sensing surfaces, e.g., a lens, of the cameras 210, 212, 214. In examples, the cleaning systems 304 include nozzle 306 configured to apply a liquid to the sensing surface.

FIG. 3 also shows aspects of electrical, data, and other connections associated with the sensor pod assemblies 102. Specifically, FIG. 3 shows a supply harness 308 that provides power and/or control signals to the sensor pod assembly 102, e.g., from the computer system(s) 122, and/or that relays data from the senor pod assembly 102 to the computer system(s) 122 of the vehicle 100. In some instances, the supply harness 308 may also include fluid and/or pressurized air connections to supply fluid and pressurized air to the cleaning systems 304.

FIG. 4 is an exploded perspective view of the one of the sensor pod assemblies 102 shown in FIGS. 2 and 3. In FIG. 4, the same reference numerals are used to reference parts introduced above, including the outer shell 118 (shown as three coupleable parts), the front facing camera 210, the side facing camera 212, the rear-facing camera 214, the upper lidar sensor 218, the lower lidar sensor 302, and the frame 220. FIG. 4 also shows an upper shell 402 and a lower shell 404. The upper shell 402 is configured to be disposed over the top opening shown in FIG. 2. The lower shell 404, is configured to cover a lower portion of the sensor pod assembly. In examples, the lower LiDAR sensor 302 may be at least partially disposed in the lower shell 404. The outer shell 118, the upper shell 402, and the lower shell 404 may be configured to be coupled to each other and/or to the frame 220 to form an outer using that protects internal components of the assembly 102 from the atmosphere. Although omitted for clarity from FIG. 4, seals, brackets, clips, tabs, and/or the like, may be provided to seal and/or secure the portions of the housing relative to each other. FIG. 4 also illustrates and example of a mounting bracket 406. In examples, the mounting bracket 406 is attached to a vehicle (e.g., the vehicle 100) and the frame 220 is attached to the mounting bracket 406.

As noted above, aspects of this disclosure are associated with mitigating impacts to features of the sensor pod assembly 102 and especially to mitigating impacts proximate the front-facing camera 210, the lower LiDAR sensor 302, and the upper LiDAR sensor 218. As will be appreciated, these features are at a leading edge of the sensor pod assembly and thus may be more likely to be impacted by a pedestrian or other object proximate the vehicle. More specifically, the sensor pod assembly 102 can include a first impact structure 406 associated with the front-facing camera 210, a second impact structure 408 associated with the lower LiDAR sensor 302, and/or a third impact structure 410 associated with the upper LiDAR sensor 218. As detailed further below, each of the impact structures 408, 410, 412 can include a component, or a combination of components, that absorbs a portion of energy resulting from an impact, e.g., to lessen forces experienced by the object and/or respective components of the sensor pod assemblies 102. The first impact structure 408 is detailed further below with reference to FIGS. 5, 6A, and 6B, the second impact structure 410 is detailed further below with reference to FIG. 7, and the third impact structure 412 is detailed further below with reference to FIGS. 8 and 9.

More specifically, FIG. 5 is an exploded perspective view showing aspects of the first impact structure 408, associated with the front-facing camera 210. The front-facing camera 210 is shown schematically, and generally includes a lens 502 and a camera body 504. The front-facing camera 210 may be a conventional imager, configured to capture image data of an environment of the vehicle. In other examples, the front-facing camera 210 may be a different sensor modality, e.g., including but not limited to a time-of-flight sensor, a radar sensor, a sonar sensor, or the like.

As also shown in FIG. 5, the first impact structure 408 can also include a baffle 506. The baffle 506 generally includes a sidewall 508 having an inner surface 510 defining a longitudinal opening 512. The longitudinal opening 512 may be a camera opening, e.g., sized to receive the front-facing camera 210 therein, and in some instances, the camera is received so as to be spaced from the inner surface 510 of the sidewall 508. In examples, the sidewall 508 is substantially rectangular, including opposite lateral sides 514, a top 516, and a bottom 518. However, in other examples, the sidewall 508 may be differently shaped. Without limitation, the sidewall 508 may define a circular, elliptical, triangular, or other shaped-opening.

As also illustrated in FIG. 5, the baffle 506 can include a number of deformation openings, formed as slots 520, formed through the sidewall 508. In the example, two of the slots 520 are formed in each of the lateral sides 514 of the sidewall 508, e.g., spaced axially from each other, and a single one of the slots 520 is formed through the top 516 of the sidewall 508. The number and positions of the slots 520 is for example only, as more, fewer and/or differently oriented slots may be formed in the sidewall 508. Although a relatively larger opening 522 is illustrated as being formed in the bottom 518 of the baffle 506, e.g., as another deformation opening, one or more of the slots 520 may be formed though the bottom 518, instead.

In examples, it may be desirable to provide the deformation openings about substantially the entire perimeter of the baffle 506. For example, as in FIG. 5, deformation openings, e.g., the slots 520 and/or the opening 522, are formed in each of the four sides (the lateral sides 514, the top 516, and the bottom 518) of the sidewall 508. As will be appreciated, providing the deformation openings in each of the sides may facilitate a type of "crushing" deformation of the sidewall 508, e.g., in which the entire periphery moves generally along the axial direction. However, in other examples, the deformation openings can be provided on fewer than all sides of the sidewall 508. As will be appreciated, however, a side of the sidewall 508 that is free of deformation openings may provide a greater resistance to deformation of that side in the axial direction. This resistance may result in other types of deformation, e.g., bending instead of crushing, which could be more desirable in certain applications.

In operation, the slots 520 can be numbered, sized, positioned, and/or shaped to provide a desired deformation of the baffle 506 in response to an impact force. More specifically, FIGS. 6A and 6B are side views showing the baffle 506, the front-facing camera 210, and a portion of the outer shell 118 in a normal state 600 (FIG. 6A) and an impacted state 602 (FIG. 6B).

As illustrated in FIG. 6A, the front-facing camera 210 is disposed in the baffle 506 such that the interior surface of the baffle 506 is spaced from the camera 210. Moreover, the camera 210 is disposed such that at least a portion of the baffle 506 is outboard, or nearer the outer shell 118, than the lens 502. For examples, the baffle may extend up to about 5 mm to 7 mm or more beyond the lens 502. Because the baffle 506 extends past the lens 502, the baffle 506 also blocks stray light from entering the lens 502, e.g., at angles outside a nominal field of view of the front-facing camera 510. Specifically, the sidewall 508 of the baffle 506 at a position proximate the lens 502 can be opaque, thereby acting as a shield to stray and/or reflected light that may otherwise undesirably enter the lens 502. To facilitate the sidewall 508 acting as a light shield, as just described, the slots 520 may be performed inboard relative to the lens 502. That is, the slots 520 may be formed in the sidewall so as to be disposed, in the axial direction, on a side of the lens 502 opposite the outer shell 118.

As also shown in FIG. 6A, the bezel opening 204 in the outer shell 118 includes an angled inner surface 606 that cooperates with the baffle 506. Specifically, the inner surface 606 may form a portion of the bezel opening 204 that couples to a distal end of the baffle 506. In at least some examples, the inner surface 606 is angled in a manner that approximates a field of view 608 of the camera 210. For instance, in some examples, the inner surface 606 is on the order of from about 1 mm to about 3 mm larger than the nominal field of view of the camera 210. In still further examples, the inner surface 606 may be formed to partially occlude the field of view 608 of the front-facing camera 210, e.g., to effectively reduce the field of view 608. By sizing the inner surface 606 in this manner, more of the outer surface 202 of the outer shell 118 may be preserved, relative to previous designs. Because the outer shell 118 is convex, the outer surface 202 has a resulting larger surface area, relative to those previous designs. The larger surface area, along with the baffle 506, facilitates impact mitigation, as detailed further herein.

For example, the shape, properties, and/or other aspects of the first impact structure 408, e.g., including the outer shell 118 and/or the baffle 506, cause a local plastic deformation, thereby absorbing energy from an impact and away from the pedestrian or other object. For example, the absorption of this energy reduces the acceleration concentration experienced by the pedestrian. In examples, the first impact structure 408 is configured to cause the local plastic deformation above a first impact force threshold and below a second impact force threshold. In this example, it is useful for aspects of the first impact structure 408, e.g., the outer shell 118 and/or the baffle 506, to be deformable enough to absorb enough energy from the impact to protect a pedestrian, but not so deformable that unnecessary damage is caused during handling or minor impacts. Additionally, it is useful for the first impact structure to not be too stiff such that it does not absorb enough energy from the impact to protect a pedestrian.

FIG. 6B shows the impacted state 602, resulting from an impact generally along the direction of arrow 610. More specifically, the impact causes the outer shell 118 to move inboard, e.g., toward the front-facing camera 210. The inner surface 606 contacts the baffle 506, transferring the force to the sidewall which is also pressed inboard. The force transferred to the baffle 506 can cause the baffle to deform, e.g., crumple, at a weakened area 612 formed by the slots 520. Specifically, the slots 520 can be configured to cause a controlled crumpling or deformation of the baffle 506 at the weakened area 612. As also illustrated in FIG. 6B, in aspects of this disclosure, because the camera is spaced, e.g., radially, from the baffle 506, the combined baffle and bezel may result in little to no impact with the front-facing camera 210, thereby protecting the front-facing camera 210 and an external impacting with a sensor pod.

Although the examples of FIGS. 5, 6A, and 6B, show the slots 520 as forming the weakened area 612 that deforms in response to the applied force, other embodiments could include other weakened areas. For example, and without limitation, the weakened areas may be formed by providing one or more portions of the sidewall of the baffle 506 with a relatively thinner cross-section. For example, scores may be formed in place of the slots 520. In practice, forming the sidewall to have different thicknesses may be more costly and/or difficult to manufacture, but could provide similar energy absorption. In other examples, openings other than the slots 520 may be formed through the sidewall. Such openings can include, but are not limited to, notches, holes, scores, tears, or the like.

FIG. 7 is an exploded perspective view showing aspects of the second impact structure 410, associated with the lower LiDAR sensor 302. The lower LiDAR sensor is shown schematically, and generally includes a cylindrical body 702. The lower LiDAR sensor 302 may be a conventional LiDAR sensor, configured to transmit light and receive that light reflected off objects in the environment of the sensor. For example, the light emitter/receiver may be configured to rotate about an axis of the LiDAR sensor 302. In other examples, the lower LiDAR sensor 302 may be a different sensor modality, e.g., including but not limited to a time-of-flight sensor, a radar sensor, a sonar sensor, or the like.

FIG. 7 also shows a LiDAR mount 704 configured to mitigate damage caused by impacts with the lower LiDAR sensor 302. For example, and as best shown in FIG. 1 as the second LiDAR sensor 114, the lower LiDAR sensor 302 may be prone to contact by pedestrians, e.g., a head of a pedestrian, proximate the vehicle to which the lower LiDAR sensor 302 is attached. In FIG. 7, the direction of likely impact is generally shown by the arrow 706, which corresponds to the direction shown by the arrow 120 in FIG. 1.

The LiDAR mount 704 includes a number of attachment features 708 via which the LiDAR mount 704 is attached to the frame 220. The attachment features 708 are shown as tabs in FIG. 7, extending generally in a horizontal plane, e.g., parallel to flat ground on which the vehicle may be positioned. Other connections may be used to secure the LiDAR mount 704 to the frame 220. Without limitation, mechanical fasteners, e.g., screws, bolts, rivets, or the like may be used to secure the LiDAR mount 704 to the frame 220.

Moreover, and although obscured in FIG. 7, the LiDAR mount 704 includes a LiDAR mounting surface 710. The LiDAR mounting surface 710 is a surface to which the lower LiDAR sensor 302 is coupled. For instance, a plurality of holes 712 (one of which is visible in FIG. 7) may be formed through the LiDAR mounting surface 710. The holes 712 are sized and positioned to align with a bolt or other hole pattern 714 on the lower LiDAR sensor 302 to facilitate attachment of the lower LiDAR sensor 302 to the mounting surface 710. The LiDAR mounting surface 704 can be angled, e.g., relative to the horizontal plane in which the attachment features 708 extend. The lower LiDAR sensor 302 may be angled to provide a desired field of view, e.g., of an environment next to the vehicle. Opposite the LiDAR mounting surface 710 is a rear surface 716, which can also be angled relative to the horizontal plane discussed above. For example, the rear surface 716 may be substantially parallel to the mounting surface 710. As also shown, a rib 718 protrudes from the rear surface 712. The rib 714 has a variable height, e.g., above the rear surface 712, a thickness, generally measured in the direction of the arrow 706, and a length, normal to the height and width.

The LiDAR mount 704 acts as an impact mitigation structure for forces impacting the lower LiDAR sensor generally in the direction of the arrow 706. For example, when the lower LiDAR sensor 302 is mounted to the LiDAR mount 704 and is impacted in the direction of the arrow 706, the LiDAR mount flexes with the impact. For instance, because the thickness of the rib 718 is generally aligned with the direction of impact, the LiDAR mount is able to deflect in that direction. However, the rib 718 provides enhanced stiffness in directions normal to the direction of the arrow 706, including in a direction along the axis of the LiDAR body 702. Accordingly, the LiDAR mount 704 is not adversely affected by forces resulting from normal operation of the vehicle, e.g., caused by contacting bumps, potholes, or the like. Stated differently, the LiDAR mount 704, with the rib 718, provides a first, relatively reduced stiffness, in a first direction corresponding to a direction of impact, and a second, relative higher stiffness, in a second direction normal to the first direction. Maintaining a minimum stiffness of the LiDAR mount 704 may be particularly important to maintain proper functioning of the lower LIDAR sensor 302. For example, a mount that is insufficiently rigid can result in drift of the sensor, e.g., over time and/or during operation of the vehicle to which the sensor is mounted. Such drift may cause the sensor to be miscalibrated and/or generate unreliable sensor data. As will also be appreciated, making the LiDAR mount 704 too stiff can prevent energy absorption during an impact with the lower LiDAR sensor 302. The LiDAR mount 704 provides the structural stiffness necessary to prevent sensor drift, but allows for deformation sufficient to absorb energy caused by impacts with the lower LiDAR sensor 302.

Conventionally, LiDAR sensors may be mounted using mounts made from metal. Specifically, metal may be desired for its relative stiffness, which, as discussed above, is preferred to maintain a position of the sensor. However, because of the improved structure described herein, the LiDAR mount 704 may alternatively be formed of non-metallic materials. In examples, the LiDAR mount may be made from various materials, including, for example, nylon, glass filled nylon, and/or glass filled polypropylene among others. For example, the impact energy absorbing structure 906 may be made from plastics (e.g., Polyethylene Terephthalate (PET or PETE or Polyester), High-Density Polyethylene (HDPE), Polyvinyl Chloride (PVC), Low-Density Polyethylene (LDPE), Polypropylene (PP), Polystyrene (PS), (ABS), others), polycarbonates, polyamide, and/or combinations thereof.

Conventional mounts for LiDAR sensors may also have been made of metal because metal may have desirable heat dissipation properties, e.g., to prevent overheating of the LiDAR sensor. Such heat may result from normal operation of the sensor, but also from exposure to the atmosphere, including exposure to the sun. However, and as best shown in FIG. 4, the LiDAR mount 704 is configured for attachment to a lower, e.g., bottom, surface of the frame 220. Accordingly, the lower LiDAR sensor 302 has minimal exposure to the sun and/or other atmospheric elements, so dissipating heat may be less important. In still further examples, a heat sink may be disposed between the lower LiDAR sensor 302 and the LiDAR mount 704, e.g., similar to the arrangements shown in FIGS. 8 and 9, discussed below.

FIG. 8 is an exploded perspective view showing an arrangement of the third impact structure 412, associated with the upper LiDAR sensor 218. The upper LiDAR sensor is shown schematically, and generally includes a cylindrical body 802. The upper LiDAR sensor 218 may be a conventional LiDAR sensor, configured to transmit light and receive that light reflected off objects in the environment of the sensor. For example, the light emitter/receiver may be configured to rotate about an axis of the LiDAR sensor 218. The upper LiDAR sensor 218 may be disposed such that an axis of the sensor is substantially vertical. In other examples, the lower LiDAR sensor 302 may be a different sensor modality, e.g., including but not limited to a time-of-flight sensor, a radar sensor, a sonar sensor, or the like.

The impact structure 412 shown in FIG. 8 includes a cooling plate 804 disposed between the sensor 218 and a mounting surface 806. In the illustrated example, the cooling plate 804 has three arms 808 each including a through hole 810. The through holes 810 are positioned to align with bolt or mounting holes on the LiDAR sensor 218. Although the cooling plate 804 is illustrated as including the three arms 808, this arrangement is for example only. In other implementations, the cooling plate 804 may be otherwise shaped or sized. The cooling plate may be made of aluminum or some other material that dissipates heat. For example, the upper LiDAR sensor 218 may generate heat during operation that is dissipated by the cooling plate 804. Moreover, because the upper LiDAR sensor 218 may be more likely exposed to direct sunlight, the cooling plate 804 can also dissipate heat from ambient conditions, e.g., to prevent malfunctioning of the upper LiDAR sensor 218 due to overheating.

As illustrated in FIG. 8, the cooling plate 804 can also include second openings 812. The second openings 812 are configured to receive shear pins 814 protruding from the mounting surface 806. In examples of this disclosure, the shear pins 312 are selected to break at a minimum applied force. As will be appreciated, the minimum applied force may be associated with a force from an impact with a pedestrian or other object in the environment of the vehicle, to cause the cooling plate 804, and thus the upper LiDAR sensor coupled thereto, to separate from the mounting surface 806. By separating in this manner, the force of an impact with the upper LiDAR sensor 218 may be mitigated.

In the example of FIG. 8, the mounting surface 806 may be integrated into a mounting block or other mounting structure. Alternatively, the mounting surface 806 may be a surface of the frame 220, discussed above. As will be appreciated from the foregoing, like the impact structure 410 described above in connection with FIG. 7, the impact structure of FIG. 8 provides for deformation, here, separation, at a first applied force in a direction of likely impact, e.g., a horizontal direction, but has a rigid connection in the direction of the axis of the upper LiDAR sensor 218.

FIG. 9 is an exploded perspective view showing an alternative arrangement 412' of the third impact structure, associated with the upper LiDAR sensor 218. The upper LiDAR sensor is shown schematically, and generally includes a cylindrical body 902. The upper LiDAR sensor 218 may be a conventional LiDAR sensor, configured to transmit light and receive that light reflected off objects in the environment of the sensor. For example, the light emitter/receiver may be configured to rotate about an axis of the LiDAR sensor 218. The upper LiDAR sensor 218 may be disposed such that an axis of the sensor is substantially vertical. In other examples, the lower LiDAR sensor 302 may be a different sensor modality, e.g., including but not limited to a time-of-flight sensor, a radar sensor, a sonar sensor, or the like.

The alternative impact structure 412' shown in FIG. 9 includes a cooling plate 904 disposed between the sensor 218 and a flexible mount 906. In the illustrated example, the cooling plate 904 is a disc and includes first through holes 908 and second through holes 910. The first through holes 908 are positioned to align with bolt or mounting holes on the LiDAR sensor 218. Although the cooling plate 904 is illustrated as a circular shape, this arrangement is for example only. In other implementations, the cooling plate 904 may be otherwise shaped or sized, including but not limited to the size and shape of the cooling plate 804 discussed above. The cooling plate may be made of aluminum or some other material that dissipates heat. For example, the upper LiDAR sensor 218 may generate heat during operation that is dissipated by the cooling plate 904. Moreover, because the upper LiDAR sensor 218 may be more likely to be exposed to direct sunlight, the cooling plate 904 can also dissipate heat from ambient conditions, e.g., to prevent malfunctioning of the upper LiDAR sensor 218 due to overheating.

The second through holes 910 are configured to align with holes 912 through a mounting surface 914 in the flexible mount 906. Fasteners may be passed through the second through holes 910 and the holes 912 to secure the cooling plate 904 to the flexible mount 906. The flexible mount 906 includes a plurality of legs 916 extending from the mounting surface 914 and terminating at feet 918. The feet 918 may be secured to the frame 220, e.g., via fasteners passed through mounting holes 920 in the feet 918. In examples of this disclosure, the legs 916 are configured to deform, e.g., by bending, at a minimum applied force. As will be appreciated, the minimum applied force may be associated with a force from an impact with a pedestrian or other object in the environment of the vehicle, to cause the cooling plate 804, and thus the upper LiDAR sensor coupled thereto, to deflect in a direction of the applied force. By deforming in this manner, the force of an impact with the upper LiDAR sensor 218 may be mitigated.

As will be appreciated from the foregoing, like the impact structure 410 described above in connection with FIG. 7 and the impact structure 412 described above in connection with FIG. 8, the impact structure of FIG. 9 provides for deformation at a first applied force in a direction of likely impact, e.g., a horizontal direction, but has a rigid connection in the direction of the axis of the upper LiDAR sensor 218.

Example Clauses

Any of the example clauses in this section may be used with any other of the example clauses and/or any of the other examples or embodiments described herein.

A: An example sensor pod includes: a frame configured to be coupled to a vehicle; a camera coupled to the frame; and an impact structure coupled to the frame, the impact structure comprising: an outer surface configured to interface with an object during an impact, at least a portion of the outer surface disposed outboard of the camera; and a baffle disposed between the outer surface and frame, the baffle comprising a sidewall defining a camera opening, and a deformation opening formed through the sidewall, the sidewall being configured to deform at the deformation opening to absorb energy in response to the object interfacing with the outer surface during the impact, wherein at least a portion of the camera is aligned with the camera opening.

B: The sensor pod of example A, wherein the outer surface and the baffle are configured to plastically deform in response to the object interfacing with the outer surface.

C: The sensor pod of example A or example B, wherein the interior surface of the sidewall is spaced from the camera.

D: The sensor pod of any one of example A through example C, wherein: the sidewall comprises a plurality of surfaces defining the camera opening, and the deformation opening comprises a plurality of slots, at least one of the slots being formed through each of the one or more surfaces.

E: The sensor pod of any one of example A through example D, wherein the deformation opening is formed through the sidewall at a position inboard of a lens of the camera.

F: The sensor pod of any one of example A through example E, wherein the sidewall extends to a position outboard of the camera lens and the portion of the sidewall outboard of the lens is opaque to block light from reaching the lens of the camera through the sidewall.

G: An example system includes: a frame configured to be coupled to a vehicle; a sensor coupled to the frame; and an impact structure coupled to the frame, the impact structure comprising: an outer surface configured to interface with an object during an impact, at least a portion of the outer surface disposed outboard of the sensor relative to the frame; and an impact energy absorbing feature having a sidewall defining a sensor opening at least partially surrounding the sensor, the sidewall including a weakened area configured to deform and absorb a portion of energy transferred through the outer surface from the impact.

H: The system of example G, wherein: the impact energy absorbing feature comprises a baffle disposed around the sensor and the baffle is configured to plastically deform, at the weakened area.

I: The system of example G or example H, wherein the weakened area comprises one or more deformation openings formed through the sidewall.

J: The system of any one of example G through example I, wherein the one or more deformation openings comprise a plurality of slots formed through the sidewall, the slots extending in a direction angled relative to a longitudinal axis of the baffle.

K: The system of any one of example G through example J, wherein the one or more deformation openings are inboard of a lens of the sensor such that light passing through the one or more deformation openings contacts the sensor at a position other than the lens.

L: The system of any one of example G through example K, wherein the outer surface is substantially convex.

M: The system of any one of example G through example L, wherein: the impact structure further comprises a bezel disposed between the outer surface and the sidewall.

N: The system of any one of example G through example M, wherein: the bezel defines an aperture aligned with a lens of the sensor and through which light is received by the sensor; and the aperture is sized to approximate a field of view of the sensor.

O: The system of any one of example G through example N, wherein the aperture is within about 2 millimeters of the field of view of the sensor.

P: An example vehicle includes: a vehicle body; a sensor pod protruding from the vehicle body, the sensor pod comprising: a frame configured to be coupled to the vehicle body; a sensor coupled to the frame; and an impact structure coupled to the frame, the impact structure comprising: an outer surface configured to interface with an object during an impact, at least a portion of the outer surface disposed outboard of the sensor relative to the frame; and an impact energy absorbing feature having a sidewall defining a sensor opening at least partially surrounding the sensor, the sidewall including a weakened area configured to deform in response to the impact to absorb a portion of energy transferred through the outer surface from the impact.

Q: The vehicle of example P, wherein: the impact energy absorbing feature comprises a baffle; and the weakened area comprises a plurality of deformation openings formed through the sidewall.

R: The vehicle of example P or example Q, wherein the one or more openings comprise a plurality of slots formed through the sidewall, the slots extending in a direction angled relative to a longitudinal axis of the baffle.

S: The vehicle of any one of example P through example R, wherein the one or more deformation openings are inboard of a lens of the sensor such that light passing through the one or more deformation openings contacts the sensor at a position other than the lens.

T: The vehicle of any one of example P through example S, wherein the sidewall extends outboard of the lens of the sensor and the portion of the sidewall outboard of the lens is opaque to prevent light outside a field of view of the sensor from contacting the lens.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A sensor pod comprising:
a frame configured to be coupled to a vehicle;
a camera coupled to the frame; and
an impact structure coupled to the frame, the impact structure comprising:
an outer surface configured to interface with an object during an impact, at least a portion of the outer surface disposed outboard of the camera; and
a baffle disposed between the outer surface and frame, the baffle comprising a sidewall defining a camera opening, and a deformation opening formed through the sidewall, the sidewall being configured to deform at the deformation opening to absorb energy in response to the object interfacing with the outer surface during the impact and the sidewall extending to a position outboard of a lens of the camera, wherein at least a portion of the camera is aligned with the camera opening.

2. The sensor pod of claim 1, wherein the outer surface and the baffle are configured to plastically deform in response to the object interfacing with the outer surface.

3. The sensor pod of claim 1, wherein the interior surface of the sidewall is spaced from the camera.

4. The sensor pod of claim 1, wherein:
the sidewall comprises a plurality of surfaces defining the camera opening, and the deformation opening comprises a plurality of slots, at least one of the slots being formed through each of the one or more surfaces.

5. The sensor pod of claim 1, wherein the deformation opening is formed through the sidewall at a position inboard of a lens of the camera.

6. The sensor pod of claim 5, wherein portion of the sidewall outboard of the lens is opaque to block light from reaching the lens of the camera through the sidewall.

7. A system comprising:
a frame configured to be coupled to a vehicle;
a sensor coupled to the frame; and
an impact structure coupled to the frame, the impact structure comprising:
an outer surface configured to interface with an object during an impact, at least a portion of the outer surface disposed outboard of the sensor relative to the frame; and
an impact energy absorbing feature having a sidewall defining a sensor opening at least partially surrounding the sensor, the sidewall including a weakened area configured to deform and absorb a portion of energy transferred through the outer surface from the impact and the sidewall extending to a position outboard of a lens of the sensor.

8. The system of claim 7, wherein:
the impact energy absorbing feature comprises a baffle disposed around the sensor and the baffle is configured to plastically deform, at the weakened area.

9. The system of claim 8, wherein the weakened area comprises one or more deformation openings formed through the sidewall.

10. The system of claim 9, wherein the one or more deformation openings comprise a plurality of slots formed through the sidewall, the slots extending in a direction angled relative to a longitudinal axis of the baffle.

11. The system of claim 10, wherein the one or more deformation openings are inboard of the lens of the sensor such that light passing through the one or more deformation openings contacts the sensor at a position other than the lens.

12. The system of claim 7, wherein the outer surface is substantially convex.

13. The system of claim 7, wherein: the impact structure further comprises a bezel disposed between the outer surface and the sidewall.

14. The system of claim 13, wherein:
the bezel defines an aperture aligned with a lens of the sensor and through which light is received by the sensor; and
the aperture is sized to approximate a field of view of the sensor.

15. The system of claim 14, wherein the aperture is within about 2 millimeters of the field of view of the sensor.

16. A vehicle comprising:
a vehicle body;
a sensor pod protruding from the vehicle body, the sensor pod comprising:
a frame configured to be coupled to the vehicle body;
a sensor coupled to the frame; and
an impact structure coupled to the frame, the impact structure comprising:
an outer surface configured to interface with an object during an impact, at least a portion of the outer surface disposed outboard of the sensor relative to the frame; and
an impact energy absorbing feature having a sidewall defining a sensor opening at least partially surrounding the sensor, the sidewall including a weakened area configured to deform in response to the impact to absorb a portion of energy transferred through the outer surface from the impact and the sidewall extending to a position outboard of a lens of the sensor.

17. The vehicle of claim 16, wherein:
the impact energy absorbing feature comprises a baffle; and
the weakened area comprises a plurality of deformation openings formed through the sidewall.

18. The vehicle of claim 17, wherein the one or more openings comprise a plurality of slots formed through the sidewall, the slots extending in a direction angled relative to a longitudinal axis of the baffle.

19. The vehicle of claim 18, wherein the one or more deformation openings are inboard of the lens of the sensor such that light passing through the one or more deformation openings contacts the sensor at a position other than the lens.

20. The vehicle of claim 19, wherein a portion of the sidewall outboard of the lens is opaque to prevent light outside a field of view of the sensor from contacting the lens.

\* \* \* \* \*